Patented May 15, 1923.

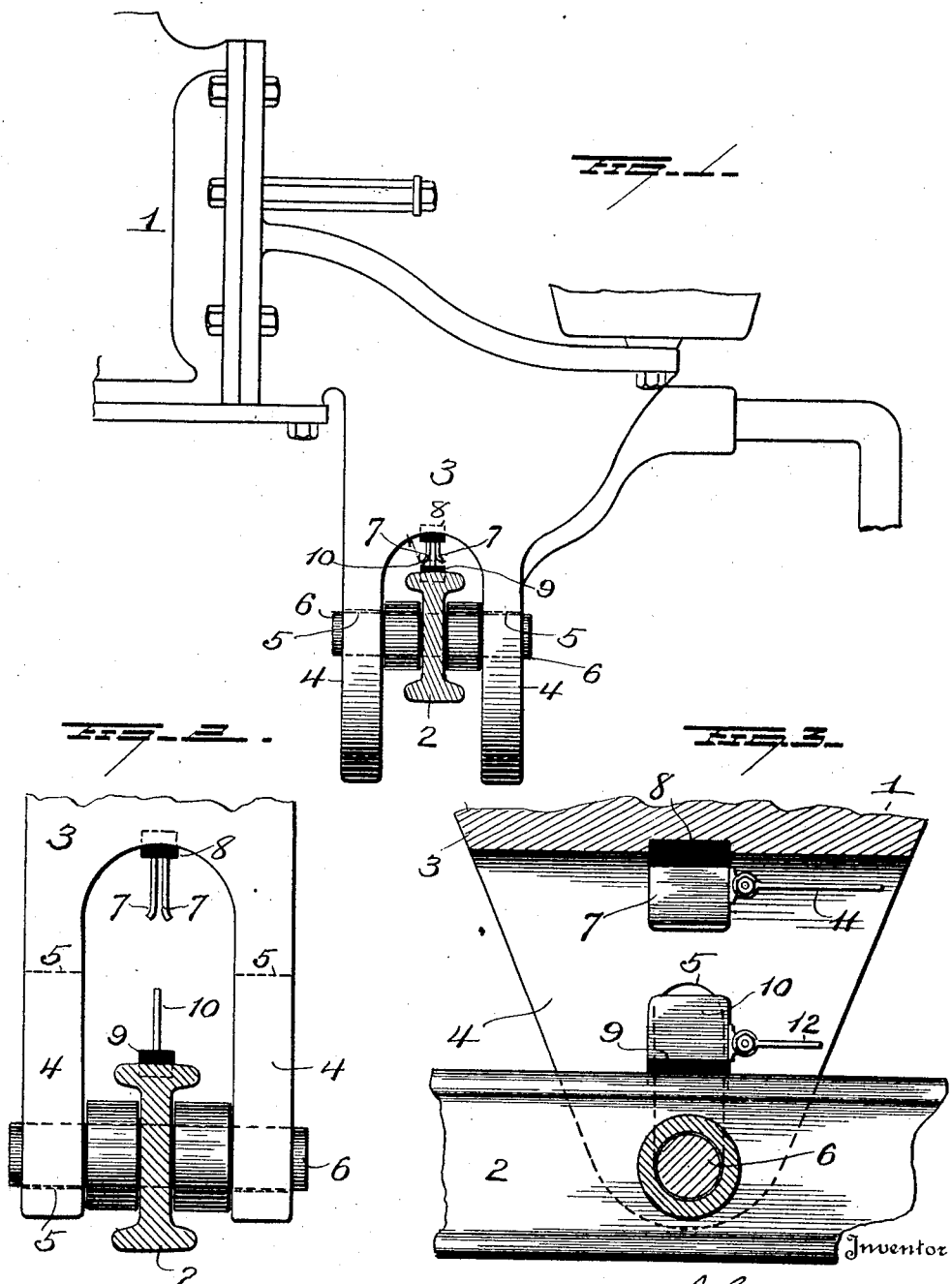

1,454,957

UNITED STATES PATENT OFFICE.

JOHN COCKRILL, OF JACKSON, TENNESSEE.

SAFETY DEVICE FOR TRACTORS.

Application filed July 23, 1921. Serial No. 487,136.

*To all whom it may concern:*

Be it known that I, JOHN COCKRILL, a citizen of the United States, and a resident of Jackson, in the county of Madison and State of Tennessee, have invented certain new and useful Improvements in Safety Devices for Tractors; and I do hereby declare the following to be a full, clear, and exact description of the invention, such as will enable others skilled in the art to which it appertains to make and use the same.

This invention relates to improvements in safety devices for tractors, and more particularly to those of the "Fordson" type.

In the operation of tractors of the Fordson type, it has been found that when the tractor is subjected to extraordinary pulling strain, the action of the engine is apt to cause the front end of the body to swing upwardly and rearwardly about the rear axle as a center, and, in some instances, this upward tilting of the tractor has been so great as to cause backward overturning of the same and subject the operator to possible loss of his life.

One object of my invention is to obviate the possibility of such accidents as above described and to provide simple and efficient means which shall be operable automatically when the forward portion of the tractor tends to tilt upwardly, to stop the engine and thus prevent the tractor from overturning.

With this and other objects in view, the invention consists in certain novel features of construction and combinations of parts as hereinafter set forth and pointed out in the claims.

In the accompanying drawings, Figure 1 is a view showing a part of the front portion of a tractor and illustrating the application of my improvements thereto. Figure 2 is a sectional view showing the positions of the parts when the tractor body has been raised relatively to the axle, and Figure 3 is a view taken at right angles to Figure 2, with the parts in the same positions as shown in Figure 2.

The body of the tractor is indicated at 1 and the front axle at 2. To the forward portion of the body 1, a depending bracket or casting 3 is secured and is of sufficient length normally to extend below the axle,— the lower portion of said bracket or casting being bifurcated to form two arms 4—4 at respective sides of the axle. These arms are provided with vertical elongated slots 5, and into these slots, the end portions of a pin 6 secured to the axle, extend.

Contact plates 7—7 are secured, through the medium of an insulating block 8, to the depending bracket or casting 3 centrally between the arms 4—4 thereof. An insulating block 9 is secured to the top of the axle and carries a contact plate or finger 10,—said contact plates 7—10 constituting circuit making and breaking means. The contact plates or fingers 7—10 are included in the sparking circuit of the tractor,—the plates or fingers 7 being preferably connected by a wire 11 with the sparking coil (not shown) and the plate or finger 10 being preferably connected by a wire 12 with the magneto winding, or if desired, the contact plates may be otherwise included in and form a part of the sparking circuit.

From the construction and arrangement of parts above described, it is apparent that the forward portion of the tractor body is movable vertically relatively to the axle and in order that such movement may be properly guided and the arms 4—4 protected against undue strain or danger of being broken, I prefer to place spacing sleeves on the pin 6 between respective sides of the axle and said arms 4—4.

Normally the body bracket or casting 3 will be supported by the axle through the medium of the pin 6, the latter being at such time disposed at the upper ends of the slots 5 in the bracket arms 4—4 and the contact plates 7—10 of the circuit closer will be electrically connected.

Should the pulling load on the tractor become so excessive as to cause the latter to rear upwardly at its forward end and tend to overturn, the body of the tractor will rise relatively to the axle and cause the contact device carried by the body bracket to move upwardly away from the contact device carried by the axle and thus the sparking circuit will be opened and the engine of the tractor caused to promptly stop. When the engine has thus stopped the forward end of the tractor body will at once descend, causing the contact devices 7—10 to again come together and re-establish the sparking circuit.

Having fully described my invention what I claim as new and desire to secure by Letters-Patent, is:

1. The combination in a tractor, of an axle and a body movable vertically with relation to the axle and normally resting on the axle, electrical circuit closing means adapted for connection in the sparking circuit of the tractor, said circuit closing means having its respective members connected with the axle and the vertically movable body and normally in contact whereby relative upward movement of the body will separate the members and break the circuit.

2. The combination with the body and forward axle of a tractor, of a body bracket depending from the forward portion of said body and provided with a part having a vertical elongated slot, a pin secured to the axle and entering said slot, electrical contact devices secured to said body bracket, and electrical contact means secured to the axle and cooperable with the contact device carried by the body bracket to normally close the sparking circuit of the tractor and to open said sparking circuit when the body rises relatively to the axle.

3. The combination with a tractor body and the forward axle, of a bracket depending from the tractor body and bifurcated at its lower end to embrace the axle, the arms of the bifurcated portion of the bracket having vertical elongated slots, a pin secured to the axle and entering said slots, and electrical circuit closing means having one of its members secured to said bracket within and at the top of the bifurcation thereof and having its other member secured upon the axle between the arms of the bifurcation of the bracket, the circuit-closing members being normally in contact and being caused to separate and break the circuit when the body rises relative to the axle.

In testimony whereof, I have signed this specification in the presence of two subscribing witnesses.

JOHN COCKRILL.

Witnesses:
A. B. ANDERSON,
GEORGE WILLIAMS.